(12) United States Patent
Kang et al.

(10) Patent No.: US 12,548,574 B2
(45) Date of Patent: Feb. 10, 2026

(54) APPARATUS FOR IMPLEMENTING SPEAKER DIARIZATION MODEL, METHOD OF SPEAKER DIARIZATION, AND PORTABLE TERMINAL INCLUDING THE APPARATUS

(71) Applicant: Samsung Electronics Co., Ltd., Suwon-si (KR)

(72) Inventors: Wan Ju Kang, Daejeon (KR); Sungju Lee, Daejeon (KR); Ryuhaerang Choi, Daejeon (KR)

(73) Assignees: Samsung Electronics Co., Ltd., Gyeonggi-Do (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 303 days.

(21) Appl. No.: 18/484,627

(22) Filed: Oct. 11, 2023

(65) Prior Publication Data

US 2024/0119943 A1    Apr. 11, 2024

(30) Foreign Application Priority Data

Oct. 11, 2022   (KR) ........................ 10-2022-0130008
Feb. 7, 2023   (KR) ........................ 10-2023-0016259

(51) Int. Cl.
- *G10L 17/00* (2013.01)
- *G10L 17/10* (2013.01)
- *G10L 17/18* (2013.01)

(52) U.S. Cl.
CPC .............. *G10L 17/10* (2013.01); *G10L 17/18* (2013.01)

(58) Field of Classification Search
CPC ....... G10L 17/10; G10L 17/18; G10L 13/033; G10L 15/14; G10L 15/20; G01S 15/62;
(Continued)

(56) References Cited

U.S. PATENT DOCUMENTS

| 7,343,289 | B2 | 3/2008 | Cutler et al. |
| 9,083,848 | B2 | 7/2015 | Ok |

(Continued)

FOREIGN PATENT DOCUMENTS

| CN | 115762519 A | * | 3/2023 |
| JP | 7046546 B2 | | 4/2022 |

(Continued)

OTHER PUBLICATIONS

IRIT "End-to-end speaker segmentation for overlap-aware resegmentation," arXiv:2104-04045v2 [eess.AS], pp. 1-5 (2021).

*Primary Examiner* — Michael Ortiz-Sanchez
(74) *Attorney, Agent, or Firm* — Harness, Dickey & Pierce, P.L.C.

(57) ABSTRACT

A speaker diarization model implementing apparatus includes a voice signal analysis module configured to generate mel-spectrogram data from voice signals of a plurality of speakers detected by a voice recognition device, a motion data analysis module configured to generate ultra-wideband (UWB) signal matrix data from motion sensing signals of the plurality of speakers detected by a motion recognition device, a multimodal learning module configured to extract characteristic values based on the mel-spectrogram data and the UWB signal matrix data, and a speaker diarization module configured to separate the plurality of speakers from each other using the characteristic values.

20 Claims, 8 Drawing Sheets

(58) Field of Classification Search
CPC ......... G01S 7/539; G01S 15/04; G06V 40/20; G06F 18/213; G06F 18/253; G06F 3/011; G06F 3/167
See application file for complete search history.

(56) References Cited

U.S. PATENT DOCUMENTS

| | | | |
|---|---|---|---|
| 11,019,306 B2 | 5/2021 | Chen et al. | |
| 11,250,869 B2 | 2/2022 | Maeng et al. | |
| 11,257,346 B1 * | 2/2022 | Meyers | G06F 3/011 |
| 12,181,847 B1 * | 12/2024 | Brett | G06N 20/00 |
| 2011/0119060 A1 * | 5/2011 | Aronowitz | G06N 7/01 |
| | | | 704/250 |
| 2021/0169361 A1 | 6/2021 | Baker et al. | |
| 2022/0299603 A1 | 9/2022 | Mcmahon et al. | |
| 2024/0119927 A1 * | 4/2024 | Koluguri | G10L 15/063 |

FOREIGN PATENT DOCUMENTS

| | | |
|---|---|---|
| KR | 10-1334015 B1 | 11/2013 |
| KR | 10-1786944 B1 | 10/2017 |
| KR | 10-2012719 B1 | 8/2019 |
| KR | 10-2396136 B1 | 5/2022 |
| KR | 10-1833731 B1 | 2/2023 |

* cited by examiner

APPARATUS FOR IMPLEMENTING SPEAKER DIARIZATION MODEL, METHOD OF SPEAKER DIARIZATION, AND PORTABLE TERMINAL INCLUDING THE APPARATUS

CROSS-REFERENCE TO RELATED APPLICATION

This application is based on and claims priority under 35 U.S.C. § 119 to Korean Patent Application No. 10-2022-0130008, filed on Oct. 11, 2022, in the Korean Intellectual Property Office, and Korean Patent Application No. 10-2023-0016259, filed on Feb. 7, 2023, in the Korean Intellectual Property Office, the disclosures of which are incorporated by reference herein in their entireties.

BACKGROUND

The inventive concepts relate to speaker diarization technologies, and more particularly, to speaker diarization model implementing apparatuses using a microphone and an ultra-wideband sensor, speaker diarization methods, and/or portable terminals including the speaker diarization model implementing apparatus.

Speaker diarization is a technique of dividing a voice signal of a plurality of speakers detected using a microphone into voice segments according to the speakers. Speaker diarization may be used as a general technique for automatically separating and recording speeches on a speaker basis. For example, speaker diarization may be used to automatically take minutes of meetings in a situation in which a plurality of speakers speak in no particular order as in meetings, interviews, transactions, trials, or the like.

Speaker diarization methods using only voice signals of speakers detected by a microphone may have poor accuracy due to ambient noise. Recently, speaker diarization methods using image data of speakers detected by a camera together with voice signals of the speakers have been researched as a speaker diarization technique robust to noise.

However, when the number of speakers increases, images of all the speakers may not be captured using one camera, and because image data is greater than voice data, costs for collecting and processing data may increase. In addition, video data recording may have the possibility of invading the privacy of speakers.

SUMMARY

The inventive concepts provide speaker diarization model implementing apparatuses, speaker diarization methods, and portable terminals including the speaker diarization model implementing apparatus that could improve the accuracy of speaker diarization while protecting the privacy of speakers The inventive concepts are not limited thereto, and the inventive concepts will be apparently understood by those skilled in the art through the following description and the accompanying drawings.

According to an aspect of the inventive concepts, a speaker diarization model implementing apparatus may include a voice signal analysis module configured to generate mel-spectrogram data from voice signals of a plurality of speakers detected by a voice recognition device, a motion data analysis module configured to generate ultra-wideband (UWB) signal matrix data from motion sensing signals of the plurality of speakers detected by a motion recognition device, a multimodal learning module configured to extract characteristic values based on the mel-spectrogram data and the UWB signal matrix data, and a speaker diarization module configured to separate the plurality of speakers from each other using the characteristic values.

According to another aspect of the inventive concepts, a speaker diarization method may include inputting a number of a plurality of speakers, generating mel-spectrogram data from voice signals of the plurality of speakers detected by a speech recognition device and ultra-wideband (UWB) signal matrix data from motion sensing signals of the plurality of speakers detected by a motion recognition device, extracting characteristic values based on the mel-spectrogram data and the UWB signal matrix data, and separating the plurality of speakers from each other based on the characteristic values and previously stored speaker characteristic values.

According to another aspect of the inventive concepts, a portable terminal may include a microphone configured to acquire voice signals from a plurality of speakers, an ultra-wideband (UWB) sensor configured to emit UWB transmission signals to the plurality of speakers and receive UWB reflection signals reflected from the plurality of speakers, and a control unit configured to separate the plurality of speakers from each other based on the voice signals and the UWB reflection signals. The control unit is further configured to generate mel-spectrogram data from the voice signals and UWB signal matrix data of the plurality of speakers from the UWB reflection signals, extract characteristic values based on the mel-spectrogram data and the UWB signal matrix data, and separate the plurality of speakers from each other based on the characteristic values and previously stored speaker characteristic values.

BRIEF DESCRIPTION OF THE DRAWINGS

Example embodiments will be more clearly understood from the following detailed description taken in conjunction with the accompanying drawings in which.

DETAILED DESCRIPTION

Hereinafter, some example embodiments will be described with reference to the accompanying drawings.

Expressions such as "at least one of," when preceding a list of elements, modify the entire list of elements and do not modify the individual elements of the list. For example, an expression such as "at least one of A, B, and C" or "at least one selected from the group consisting of A, B, and C" may be interpreted as only A, only B, only C, or any combination of two or more of A, B, and C, such as A, B, and C, A and B, B and C, and A and C.

Figure 1:
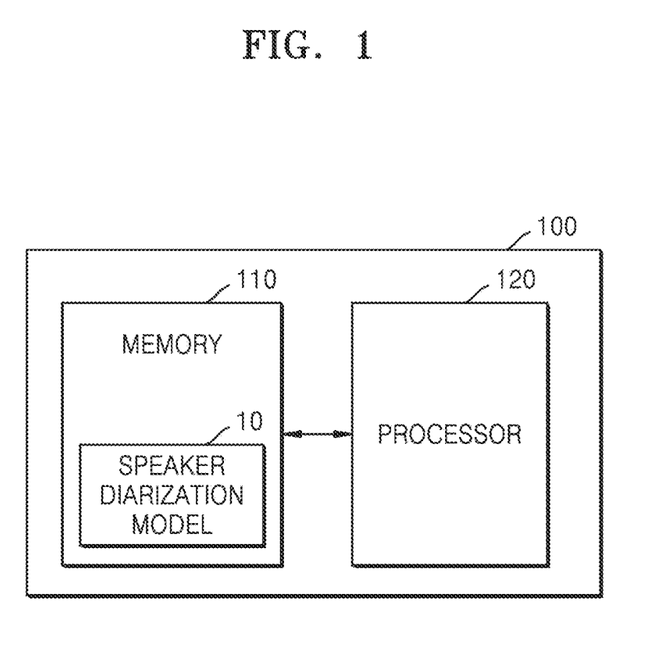
FIG. 1 is a block diagram illustrating a schematic configuration of a speaker diarization model implementing apparatus according to an example embodiment.

FIG. 1 is a block diagram illustrating a schematic configuration of a speaker diarization model implementing apparatus 100 according to an example embodiment.

Referring to FIG. 1, the speaker diarization model implementing apparatus 100 may include a memory 110 and a processor 120. The configuration shown FIG. 1 is merely a non-limiting example, and the speaker diarization model implementing apparatus 100 may further include other general-purpose components in addition to the components shown in FIG. 1.

The speaker diarization model implementing apparatus 100 may be a computing apparatus having various processing functions, such as generating a speaker diarization model 10, training the speaker diarization model 10 or causing the speaker diarization model 10 to learn, or separating speakers in a voice signal by using the speaker diarization model 10. For example, the speaker diarization model implementing apparatus 100 may be implemented as an electronic apparatus, and examples of the electronic apparatus may include various types of devices such as a personal computer (PC), a server device, and a portable terminal. According to an example embodiment, the speaker diarization model implementing apparatus 100 may perform speaker diarization after generating and training the speaker diarization model 10. However, example embodiments are not limited thereto. For example, the speaker diarization model implementing apparatus 100 may receive a previously trained speaker diarization model 10 from an external electronic apparatus. Then, the speaker diarization model implementing apparatus 100 may perform speaker diarization using the received speaker diarization model 10 or may train the received speaker diarization model 10.

The memory 110 may be hardware that stores various types of data processed in the speaker diarization model implementing apparatus 100 or to be processed in the speaker diarization model implementing apparatus 100. For example, the memory 110 may store applications, drivers, or the like to be driven by the speaker diarization model implementing apparatus 100. In addition, the memory 110 may store speaker voice signals detected by a voice recognition device and speaker motion signals detected by a motion recognition device. In this case, the voice recognition device may be a microphone, and the motion recognition device may be an ultra-wideband (UWB) sensor.

The memory 110 may store data related to the speaker diarization model 10. For example, the memory 110 may store data on layers and channels of the speaker diarization model 10. In addition, the memory 110 may store weights between the channels and biases of the channels as parameters of the speaker diarization model 10. When the speaker diarization model 10 is trained, the memory 110 may repeat a process of updating and storing parameter values, and after the training of the speaker diarization model 10 is completed, the memory 110 may store values of the parameters as final values.

The memory 110 may be dynamic random access memory (DRAM), but is not limited thereto. For example, the memory 110 may include at least one of volatile memory and nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FeRAM or FRAM), or the like. The volatile memory may include DRAM, static RAM (SRAM), synchronous DRAM (SDRAM), or the like. In another example, the memory 110 may include at least one of a hard disk drive (HDD), a solid state drive (SSD), compact flash (CF), secure digital (SD), micro secure digital (Micro-SD), mini secure digital (Mini-SD), extreme digital (xD), and a memory stick.

The processor 120 may be implemented as an array of a plurality of logic gates, or may be implemented as a combination of a general-purpose microprocessor and a memory in which programs executable by the general-purpose microprocessor are stored. The processor 120 may include a plurality of processing elements. For example, the processor 120 may be implemented as a central processing unit (CPU), a graphics processing unit (GPU), or an application processor (AP) included in the speaker diarization model implementing apparatus 100. However, the processor 120 is not limited thereto.

The processor 120 may perform overall functions for controlling the speaker diarization model implementing apparatus 100. The processor 120 may generally control the speaker diarization model implementing apparatus 100 and may handle various operations performed in the speaker diarization model implementing apparatus 100 by executing at least one program stored in the memory 110. For example, the processor 120 may generate and train the speaker diarization model 10 by referring to programs and data stored in the memory 110, thereby implementing the speaker diarization model 10.

In an example embodiment, the processor 120 may obtain 3D information on speakers by using at least one of the positions of a plurality of antennas included in the UWB sensor (described later), a time point at which each of a plurality of transmission antennas emits an UWB transmission signal, a time point at which each of a plurality of receiving antennas receives a UWB reflection signal, the magnitude and angle of the UWB transmission signal, and the magnitude and angle of the UWB reflection signal.

In an example embodiment, the processor 120 may obtain differences between signals transmitted through the transmission antennas and signals received through the receiving antennas to acquire 3D information about speakers. That is, the processor 120 may obtain differences between UWB transmission signal emission times of the transmission antennas, differences between UWB reflection signal receiving times of the receiving antennas, magnitude and angle differences between UWB transmission signals of the transmission antennas, magnitude and angle differences between UWB reflection signals of the receiving antennas, and position differences between the antennas. The processor 120 may obtain 3D information on speakers based on these differences between the antennas.

The 3D information on speakers may include coordinates of speakers in a 3D coordinate system, that is, information about the locations or directions of speakers. In addition, the 3D information on speakers may include information on movement amounts or movement velocities of speakers in the 3D coordinate system.

A UWB signal obtained through a UWB module may include information about a speaker's movement. The information about a speaker's movement may include information about a fine movement of a biological organ such as a mouth movement, a heartbeat, or respiration, as well as information about a large movement of a speaker such as a hand raise.

Figure 2:
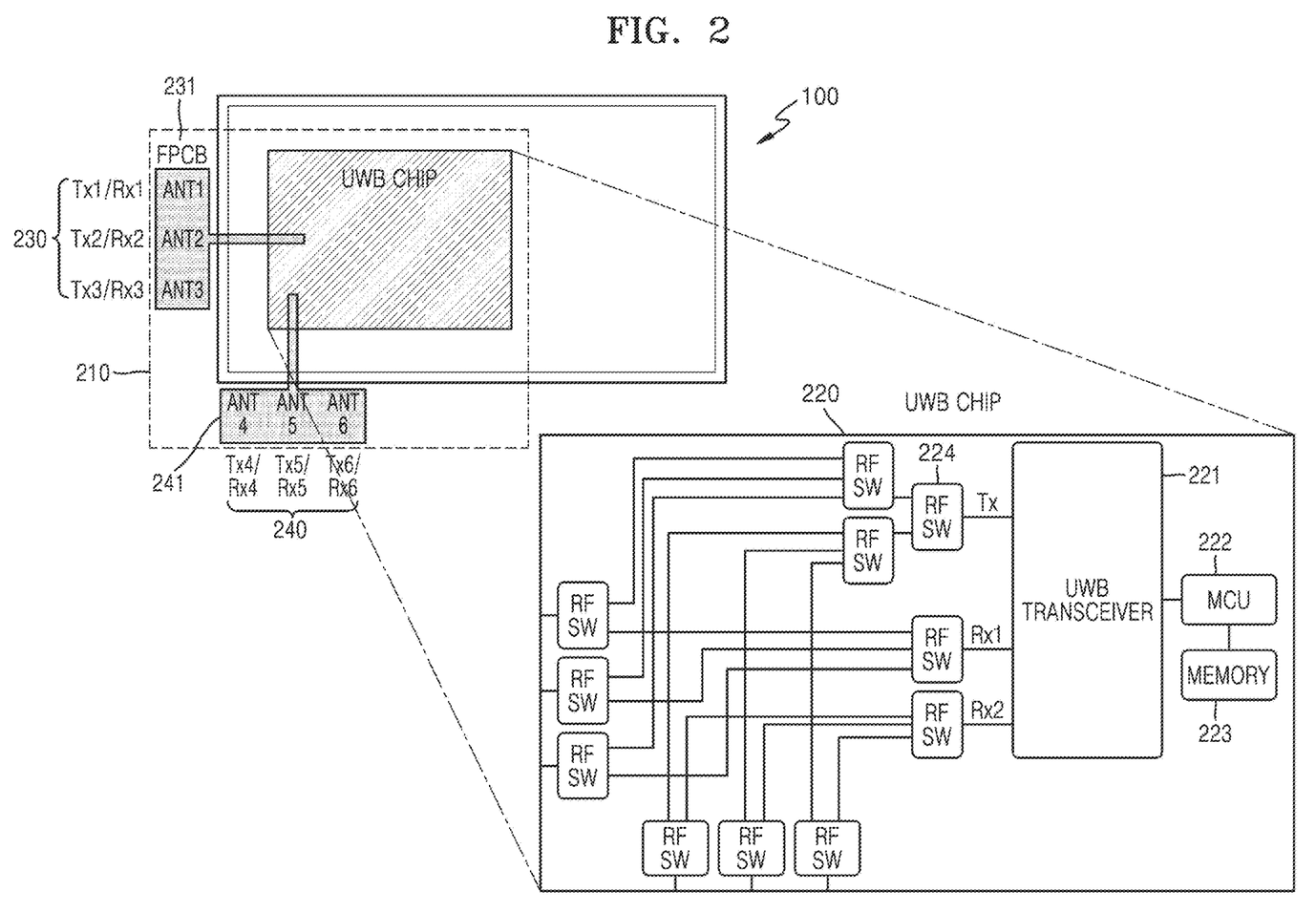
FIG. 2 is a diagram illustrating a configuration in which an ultra-wideband (UWB) motion recognition device is provided in the speaker diarization model implementing apparatus according to an example embodiment.

In addition, the speaker diarization model implementing apparatus 100 shown in FIG. 1 may not only perform operations for implementing the speaker diarization model 10, but also perform operations for separating speakers in an input speech signal by using the implemented speaker diarization model 10. That is, both the implementation of the speaker diarization model 10 and speaker diarization using the speaker diarization model 10 may be performed by the speaker diarization model implementing apparatus 100. FIG. 2 is a diagram illustrating a configuration in which a UWB motion recognition device is provided in the speaker diarization model implementing apparatus 100 according to an example embodiment.

Referring to FIG. 2, the UWB motion recognition device (refer to a motion recognition device MR shown in FIG. 4) may be an UWB sensor 210. In an embodiment, the speaker diarization model implementing apparatus 100 may be a desktop PC. However, the speaker diarization model implementing apparatus 100 is not limited thereto and may be implemented as various types of electronic apparatuses that includes an UWB module.

For example, the speaker diarization model implementing apparatus 100 may include at least one of a tablet PC, a portable terminal, an e-book reader, a laptop PC, a netbook computer, a digital camera, a camcorder, a navigation system, a wearable device, a smartwatch, a home network system, a security system, and a medical device.

In an example embodiment, the UWB sensor 210 may include a UWB chip 220, flexible printed circuit boards FPCBs 231 and 241, and a plurality of antennas 230 and 240 formed on the FPCBs 231 and 241.

In an example embodiment, as shown in FIG. 2, among components of the UWB sensor 210, the antennas 230 and 240 may be arranged on a front surface of the speaker diarization model implementing apparatus 100. The antennas 230 and 240 may be pattern antennas mounted on the FPCBs 231 and 241. A printed circuit board (PCB) may refer to a circuit component capable of transmitting electrical signals, and an FPCB may refer to an electrical circuit board provided by imparting flexibility to a hard PCB.

In an example embodiment, the FPCBs 231 and 241 may be respectively disposed in vertical and horizontal directions of the speaker diarization model implementing apparatus 100. The antennas 230 may be mounted on the FPCB 231 in the vertical direction of the speaker diarization model implementing apparatus 100, and the antennas 240 may be mounted on the FPCB 241 in the horizontal direction of the speaker diarization model implementing apparatus 100. Because the antennas 230 and 240 are disposed on the front surface of the speaker diarization model implementing apparatus 100 in the vertical and horizontal directions, respectively, information such as the location, movement, and direction of a speaker may be obtained using the antennas 230 and 240.

In an example embodiment, each of the antennas 230 and 240 may be one of an Rx antenna, a Tx antenna, and a Tx/Rx combined antenna. Tx refers to a transmission path, and Rx refers to a reception path. A TX antenna may refer to a transmission antenna that performs a function of transmitting a radio signal, and an RX antenna may refer to a receiving antenna that performs a function of receiving a radio signal. A TX/RX combined antenna may refer to a transmission/receiving antenna capable of performing both transmission and receiving functions.

RF switches 224 may each be a switch circuit that determines whether to pass or block an RF signal. Each of the RF switches 224 may switch an RF signal path depending on whether to transmit or receive a signal through a corresponding antenna.

The UWB chip 220 may include an UWB transceiver 221, a microcontroller unit (MCU) 222, a memory 223, and the RF switches 224.

The UWB transceiver 221 may be a device configured to transmit and receive data by UWB communication. The UWB transceiver 221 may perform the function of a transmitter to transmit data and the function of a receiver to receive data. The UWB transceiver 221 may be connected to the antennas 230 and 240 through the RF switches 224 and may perform both the function of data transmission and the function of data reception. The UWB transceiver 221 may be connected to the MCU 222 using a serial peripheral interface (SPI) or the like. SPI may refer to one of serial communication methods such as methos using an inter-integrated circuit (I2C), a controller area network (CAN), or a universal asynchronous receiver transmitter (UART).

The MCU 222 may be a dedicated processor of the UWB sensor 210 and may control overall operations of the UWB sensor 210.

The MCU 222 may transmit a UWB signal and process a reflected signal by using the antennas 230 and 240 and the UWB transceiver 221.

The MCU 222 may control the UWB sensor 210 by executing at least one instruction or program stored in the memory 223, thereby operating the UWB sensor 210. Furthermore, in an example embodiment, the MCU 222 may detect at least one of the location, distance, movement, and direction of a speaker by using UWB signals (for example, a UWB transmission signal and a UWB reflection signal) transmitted and received through the UWB transceiver 221.

However, this is merely an example, and a processor (not shown) of the speaker diarization model implementing apparatus 100, rather than the MCU 222, may process UWB signals transmitted and received through the UWB transceiver 221 to obtain information about at least one of the location, distance, movement, and direction of a speaker.

For example, the memory 223 may be flash memory. The memory 223 may store at least one instruction or program that may be executed by the MCU 222.

As shown in FIG. 2, the antennas 230 and 240 may be respectively connected to RF switches 224. In addition, the RF switch 224 respectively connected to the antennas 230 and 240 may be directly connected to the UWB transceiver 221, or may be connected to the UWB transceiver 221 through other RF switches 224. That is, the UWB transceiver 221 may individually drive each of the antennas 230 and 240 through one or a combination of the RF switches 224.

Referring to the example shown in FIG. 2, the UWB transceiver 221 may transmit one TX signal to the outside through six antennas ANT1, ANT2, ANT3, ANT4, ANT5, and ANT6 by using a combination of the RF switches 224. In FIG. 2, all the six antennas ANT1, ANT2, ANT3, ANT4, ANT5, and ANT6 are TX/RX combined antennas, and thus the six antennas ANT1, ANT2, ANT3, ANT4, ANT5, and ANT6 may emit a transmission signal simultaneously or sequentially at different times.

A transmission signal emitted by transmission antennas may collide with a speaker around the speaker diarization model implementing apparatus 100 and may thus be reflected. Receiving antennas of the UWB sensor 210 may receive a UWB reflection signal reflected from a speaker.

In an example embodiment, the speaker diarization model implementing apparatus 100 may obtain information on at least one of the location, distance, movement, and direction of a speaker based on a UWB transmission signal and a UWB reflection signal.

In an example embodiment, measurements such as a time point at which each of the antennas 230 and 240 receives a reflection signal and the angle between a speaker and each of the antennas 230 and 240 may vary according to factors such as the position of each of the antennas 230 and 240, the location of the speaker, and a time point at which a transmission signal is transmitted. In an example embodiment, the speaker diarization model implementing apparatus 100 may obtain information about at least one of the position, distance, movement, and direction of a speaker by using the position of each of the antennas 230 and 240, a time point at which a transmission signal is emitted, a time point at which a reflection signal is received, the magnitude and angle of the transmission signal, the magnitude and angle of the reflection signal, or the like.

Figure 3:
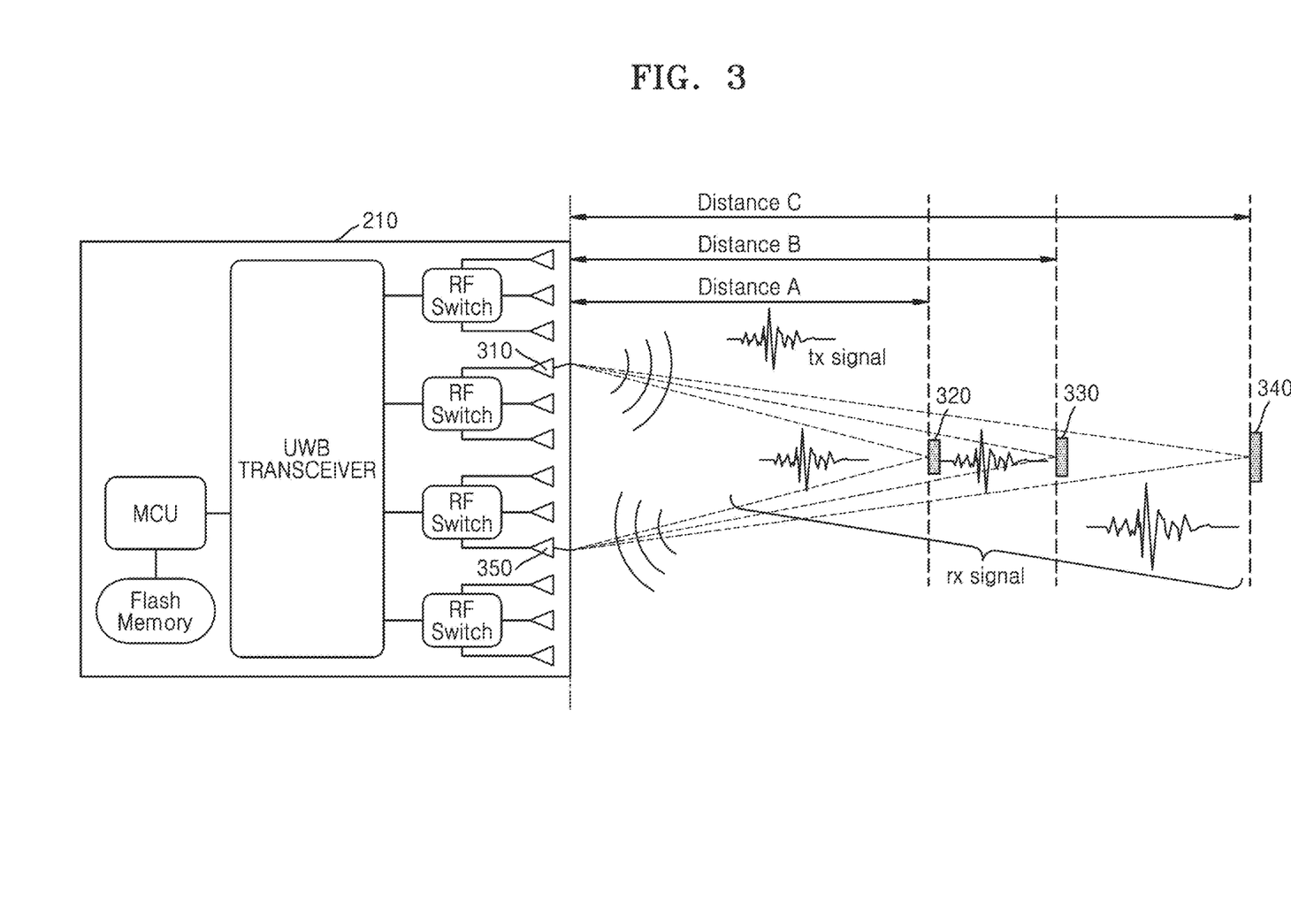
FIG. 3 is a diagram illustrating how information about the movements of speakers is obtained using antennas of a UWB sensor according to an example embodiment.

FIG. 3 is a diagram illustrating how information about the movement of a speaker is obtained using the antennas 230 and 240 of the UWB sensor 210 according to an example embodiment.

Referring to FIGS. 2 and 3, the UWB sensor 210 may include the UWB transceiver 221, the MCU 222, the memory 223, the RF switches 224, and the antennas 230 and 240.

For ease of illustration, FIG. 3 illustrates that only one transmission antenna (hereinafter referred to as a first antenna 310) among the antennas 230 and 240 of the UWB sensor 210 emits a UWB transmission signal, and the UWB transmission signal collides with speakers and reflects off the speakers.

In FIG. 3, when three speakers near the speaker diarization model implementing apparatus 100 are referred to as a first speaker 320, a second speaker 330, and a third speaker 340, respectively, and the first to third speakers 310, 320, and 330 are apart from the first antenna 310 by different distances (e.g., distances A, B, and C), respectively.

When the first antenna 310 emits an UWB transmission signal that is a pulse signal, the UWB signal emitted by the first antenna 310 may collide with and reflect off the first speaker 320. At least one receiving antenna among the antennas 230 and 240 of the UWB sensor 210 may receive a reflection signal. FIG. 3 illustrates that a second antenna 350 receives a reflection signal. In other example embodiments, however, the antennas 230 and 240 of the UWB sensor 210 may be Tx/Rx combined antennas. For example, a signal emitted from a Tx/Rx combined antenna may be reflected by a speaker and may be received by the Tx/Rx combined antenna.

In FIG. 3, when a time point at which the first antenna 310 emits a signal is 0, the signal may reflect off the first speaker 320 and may arrive at the second antenna 350 after ΔTA. In addition, the signal emitted by the first antenna 310 may collide with and reflect off the second speaker 330 and may arrive at the second antenna 350 after ΔTB. Similarly, the signal emitted by the first antenna 310 may reflect off the third speaker 340 and arrive at the second antenna 350 after ΔTC.

As shown in FIG. 3, signals reflected from the first to third speakers 310, 320, and 330, that is, UWB reflection signals, may be of different types. That is, signals reflected from the first to third speakers 310, 320, and 330 may have different waveforms such as different magnitudes or angles according to the positions of the first antenna 310 and the second antenna 350, a time point at which the first antenna 310 emits a transmission signal, time periods for the transmission signal to reflect off the first to third speakers 310, 320, and 330 and arrive at the second antenna 350, and distances between the first to third speakers 310, 320, and 330 and the first and second antennas 350. A change in the magnitude or angle of a signal in a time domain may mean a change in the amplitude or phase of the signal in a frequency domain.

The MCU 222 of the UWB sensor 210 or a processor, which is included in the speaker diarization model implementing apparatus 100 for implementing a speaker diarization model and is connected to the UWB sensor 210, may obtain information on a speaker by using at least one of the positions of the first antenna 310 and the second antenna 350, a time point at which the first antenna 310 emits a UWB transmission signal, a time point at which the second antenna 350 receives a UWB reflection signal, the magnitude of the UWB transmission signal, the angle of the UWB transmission signal, the magnitude of the UWB reflection signal, and the angle of the UWB reflection signal, that is, the angle between the speaker and the second antenna 350.

Figure 4:
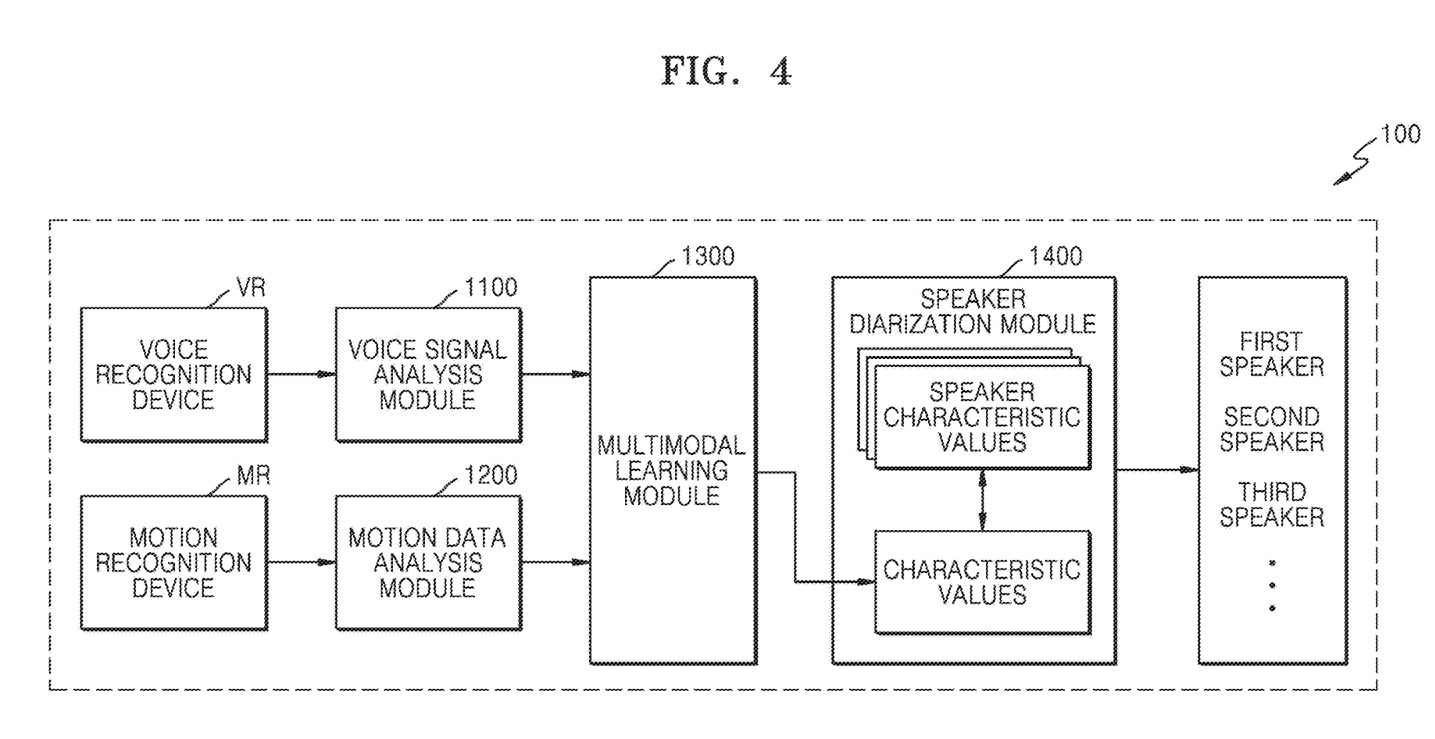
FIG. 4 is a diagram for illustrating operations of the speaker diarization model implementing apparatus that are performed on voice signals by using a speaker diarization model according to an example embodiment.
Figure 5:
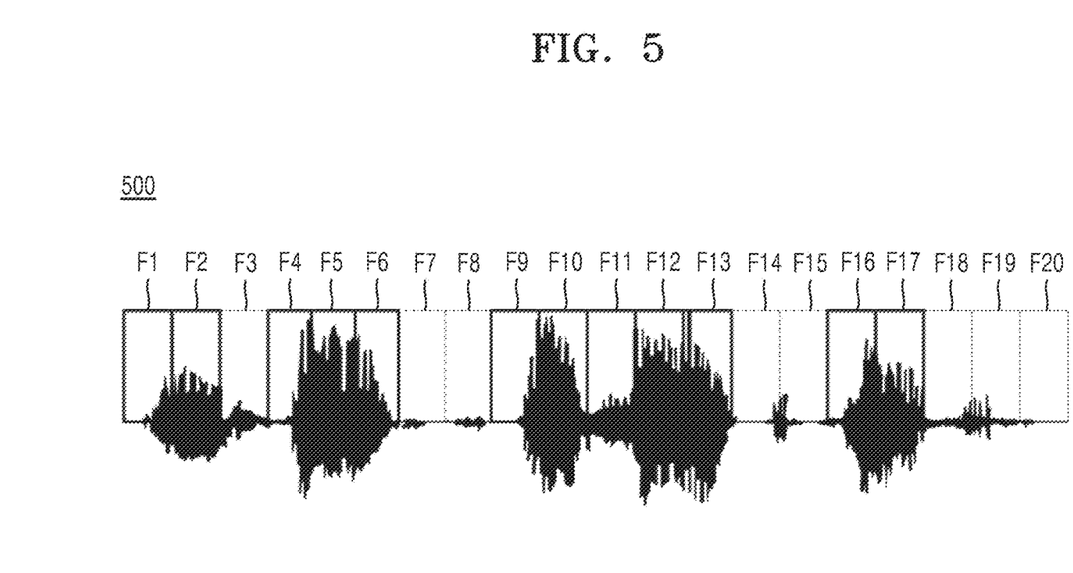
FIG. 5 is a diagram illustrating spectrogram frames according to an example embodiment.
Figure 6:
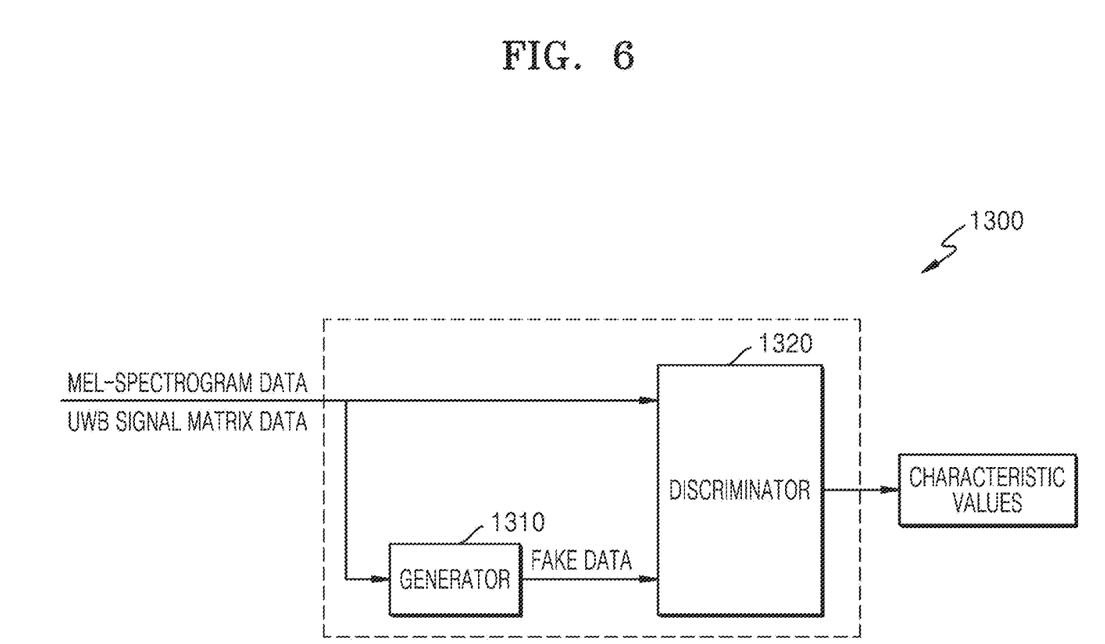
FIG. 6 is a diagram illustrating a generative adversarial network (GAN) according to an example embodiment.

FIG. 4 is a diagram for illustrating operations of the speaker diarization model implementing apparatus 100 that are performed on voice signals by using a speaker division model according to an example embodiment. FIG. 5 is a diagram illustrating spectrogram frames according to an example embodiment. FIG. 6 is a diagram illustrating a generative adversarial network (GAN) according to an example embodiment.

Referring to FIGS. 1 to 4, the speaker diarization model implementing apparatus 100 of an example embodiment may include a voice recognition device VR, a motion recognition device MR, a voice signal analysis module 1100, a motion data analysis module 1200, a multimodal learning module 1300, and a speaker diarization module 1400. The speaker diarization model implementing apparatus 100 and components of the speaker diarization model implementing apparatus 100 are each illustrated as a module. However, embodiments are not limited thereto. For example, one module may be divided into two or more modules, or two or more modules may be integrated as one module.

In addition, various modules described in the present disclosure may be implemented using software, hardware, firmware, or a combination thereof in a recording medium readable by a computer or a device similar to a computer. The example embodiments described in the present disclosure may be implemented with hardware using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electrical units involved in performing functions. Some example embodiments of procedures, functions, and the like described in the present disclosure may be implemented with separate software modules. Each of the software modules may perform one or more functions and operations described in the present disclosure.

The voice recognition device VR may be a microphone. Voices of speakers may be recognized in formats such as m4a, acc, mkv, and/or mp3. However, some example embodiments are not limited thereto.

The motion recognition device MR may be the UWB sensor 210 described above with reference to FIGS. 2 and 3. For example, the UWB sensor 210 may include the antennas 230 and 240 configured to emit an UWB transmission signal to speakers and receive an UWB reflection signal reflected from the speakers, and the UWB transceiver 221 connected to the antennas 230 and 240 through the RF switches 224.

In addition, although FIG. 4 illustrates an example embodiment in which the voice recognition device VR and the motion recognition device MR are included in the speaker diarization model implementing apparatus 100, example embodiments are not limited thereto. For example, the voice recognition device VR and the motion recognition device MR may be implemented as devices separate from the speaker diarization model implementing apparatus 100. In such case, the speaker diarization model implementing apparatus 100 may be connected to the voice recognition device VR and the motion recognition device MR through a communication interface to receive voice signals and motion sensing signals of speakers.

The voice signal analysis module 1100 may generate mel-spectrogram data from voice signals of a plurality of speakers that are detected by the voice recognition device VR. The voice signal analysis module 1100 may receive an input including text from a speaker through the voice recognition device VR. According to an example embodiment, the input including text may be an audio stream including speech data and non-speech data.

Referring to FIG. 5, the voice signal analysis module 1100 may divide the input including text (or an audio stream) into audio frames. For example, one audio frame may refer to a data chunk having a length of 16 ms. Thereafter, the voice signal analysis module 1100 may convert each audio frame into a spectrogram frame 500. According to an example embodiment, the spectrogram frames 500 may refer to the mel-spectrogram data. A mel-spectrogram frame may refer to a spectrogram in which frequencies are converted to the mel-scale such that the same distance between pitches may be perceived by humans as the same distance between pitches.

For example, frames 1 and 2 (F1 and F2), frames 4 to 6 (F4, F5, and F6), frames 9 to 13 (F9, F10, F11, F12, and F13), and frames 16 and 17 (F16 and F17) include voice, and these voice frames may each be expressed as a result value of 1. Frame 3 (F3), frames 7 and 8 (F7 and F8), frames 14 and 15 (F14 and F15), and frames 18 to 20 (F18, F19, and F20) do not include voice, and these voice frames may each be expressed as a result value of 0. As a result, the spectrogram frames F1 to F12 may be expressed as a result value of 11011100111110011000.

Referring back to FIG. 4, the motion data analysis module 1200 may generate UWB signal matrix data from motion signals of speakers detected by the motion recognition device MR.

According to an example embodiment, the motion data analysis module 1200 may express continuous visual data as a matrix by calculating a distance from the UWB sensor 210 to a movement of a speaker detected at a specific time based on angle data, signal intensity data, and time-of-flight data collected using the UWB sensor 210.

For example, the motion data analysis module 1200 may generate the UWB signal matrix data using at least one of the positions of a plurality of antennas, the emission time of a UWB transmission signal, the reception time of a UWB reflection signal, the magnitude and angle of the UWB transmission signal, the magnitude and angle of the UWB reflection signal. In this case, the UWB signal matrix data may include at least one of a piece of information on the locations of speakers, a piece of information on the directions of speakers, a piece of information on the movement amounts of speakers, and a piece of information on the movement velocities of speakers.

The multimodal learning module 1300 may extract characteristic values based on the mel-spectrogram data and the UWB signal matrix data. The multimodal learning module 1300 may generate the characteristic values by concatenating the mel-spectrogram data and the UWB signal matrix data into serial continuous data. In this case, the mel-spectrogram data and the UWB signal matrix data of speakers may be 2D data.

Referring to FIG. 6, the multimodal learning module 1300 may generate the characteristic values using a GAN according to an example embodiment.

The GAN may include a generator 1310 and a discriminator 1320. The generator 1310 may generate fake data to deceive the discriminator 1320, and the discriminator 1320 may receive actual training data (for example, mel-spectrogram data or UWB signal matrix data) and the fake data generated by the generator 1310 and may generate a characteristic value to determine whether the received data is actual training data or fake data generated by the generator 1310. Through repetition of this training, the discriminator 1320 may be trained as a speaker classifier supplemented with robustness.

Although not shown in FIG. 6, the discriminator 1320 may transmit determination information to the generator 1310, and the generator 1310 may learn to generate more realistic fake data based on the received discrimination information.

Referring back to FIG. 4, the speaker diarization module 1400 may perform speaker diarization based on the characteristic values received from the multimodal learning module 1300 and previously stored speaker characteristic values. For example, the speaker diarization module 1400 may perform speaker diarization by comparing the characteristic values received from the multimodal learning module 1300 with previously stored speaker characteristic values. In this case, the previously stored speaker characteristic values may include a characteristic value regarding the voice of each speaker and a characteristic value regarding motions of each speaker.

The speaker diarization module 1400 may determine whether the characteristic values represent specific speakers based on the similarity between the characteristic values and the previously stored (registered) speaker characteristic values. For example, the speaker diarization module 1400 may compare the characteristic values with previously stored speaker characteristic values of a first speaker, a second speaker, and a third speaker, respectively, and when the similarity between a characteristic value and a previously stored characteristic value of a particular speaker is greater than a reference value, the speaker diarization module 1400 may determine that the characteristic value represents the particular speaker. In addition, when a characteristic value of a speaker that is not previously stored is input, results of similarity comparison may not exceed the reference value, and in this case, the speaker diarization module 1400 may determine that there is no speaker corresponding to the characteristic value and may store the characteristic value as that of a new speaker.

The similarity between the characteristic values and the previously stored characteristic values of speakers may be calculated based on, for example, at least one of cosine similarity analysis and probabilistic linear discriminant analysis (PLDA). However, this is merely an example, and other various indicators may be used without limitations to indicate the similarity between two characteristic values.

As described above, according to some example embodiments, the speaker diarization model implementing apparatus 100 may perform speaker diarization using motion sensing signals of speakers collected through the UWB sensor 210 as well as voice signals of speakers collected through the voice recognition device VR (e.g., microphone). Thus, the speaker diarization model implementing apparatus 100 may be robust to ambient noise and may effectively protect personal information and privacy compared with examples in which a camera is used to reflect the movements of speakers.

Figure 7:
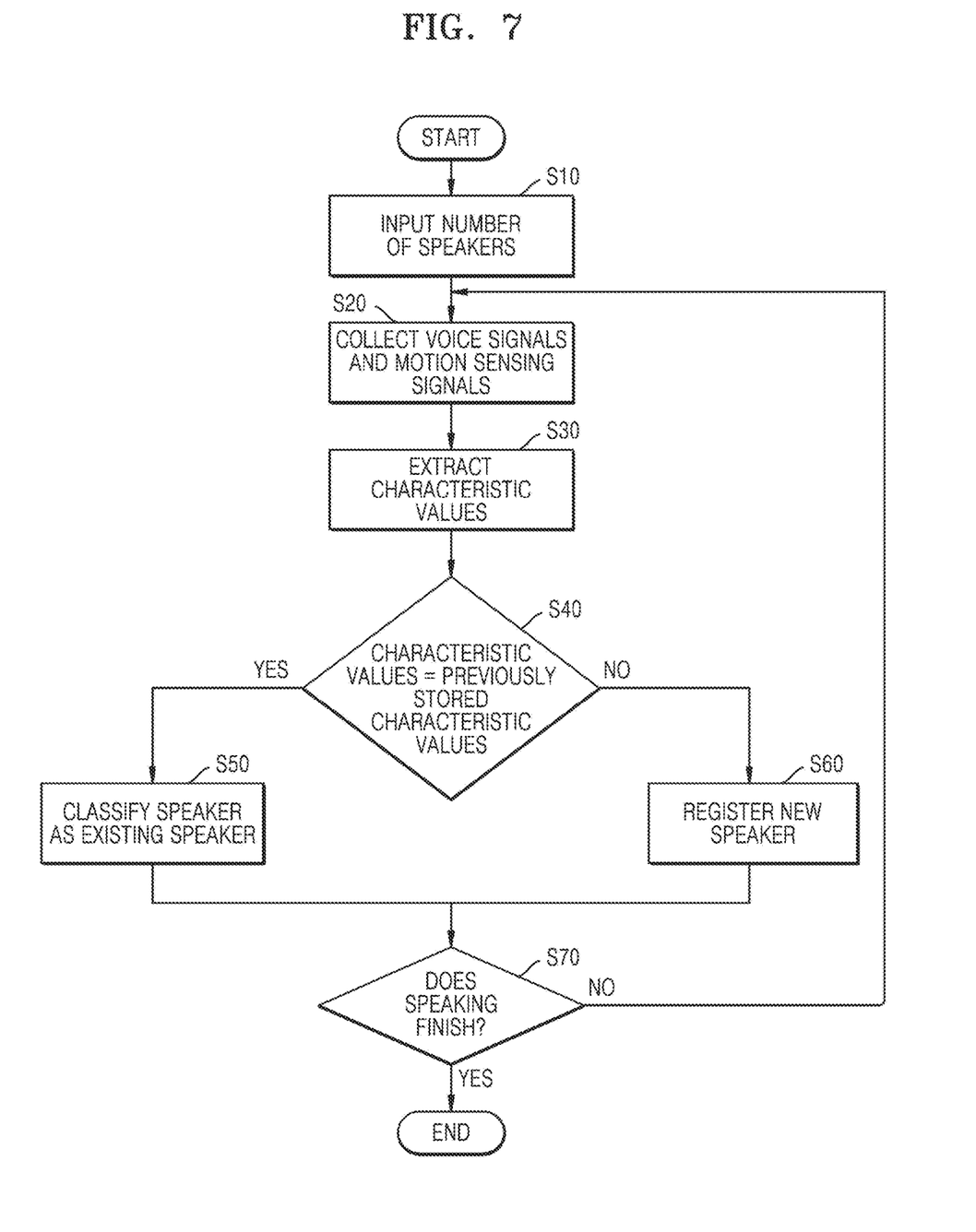
FIG. 7 is a flowchart illustrating a speaker diarization method according to an example embodiment.

FIG. 7 is a flowchart illustrating a speaker diarization method according to an example embodiment.

Referring to FIGS. 1 to 7, the speaker diarization method of an example embodiment may include inputting the number of speakers (operation S10) generating mel-spectrogram data from voice signals of a plurality of speakers detected by the voice recognition device VR and UWB signal matrix data from motion sensing signals of the speakers detected by the motion recognition device MR (operation S20), extracting characteristic values based on the mel-spectrogram data and the UWB signal matrix data (operation S30), separating the speakers based on characteristic values and previously stored speaker characteristic values (operation S40), and determining whether speaking has been finished (operation S70).

For example, in operation S10, a user of the speaker diarization model implementing apparatus 100 may input the number of potential speakers to the speaker diarization model implementing apparatus 100. Thereafter, when the user of the speaker diarization model implementing apparatus 100 provides a speaking start input, the speaker diarization model implementing apparatus 100 may activate the voice recognition device VR and the motion recognition device MR for the speakers.

In operation S20, the voice signal analysis module 1100 may generate the mel-spectrogram data from the voice signals of the speakers detected by the voice recognition device VR. The voice signal analysis module 1100 may receive an input including text from the speakers through the voice recognition device VR. According to an example embodiment, the input including text may be an audio stream including speech data and non-speech data.

The voice signal analysis module 1100 may divide the input including text (or an audio stream) into audio frames. For example, one audio frame may refer to a data chunk having a length of 16 ms. Thereafter, the voice signal analysis module 1100 may convert each audio frame into a spectrogram frame 500.

In addition, the motion data analysis module 1200 may generate the UWB signal matrix data from the motion sensing signals of the speakers detected by the motion recognition device MR.

According to an example embodiment, the motion data analysis module 1200 may express continuous visual data (or UWB signal matrix data) as a matrix by calculating distances from the UWB sensor 210 to movements of the speakers detected at a specific time based on angle data, signal strength data, and time-of-flight data collected using the UWB sensor 210. In this case, the UWB signal matrix data may include at least one of a piece of information on the locations of the speakers, a piece of information on the directions of the speakers, a piece of information on the movement amounts of the speakers, and a piece of information on the movement velocities of the speakers.

In operation S30, the multimodal learning module 1300 may extract the characteristic values based on the mel-spectrogram data and the UWB signal matrix data. The multimodal learning module 1300 may generate the characteristic values by concatenating the mel-spectrogram data and the UWB signal matrix data into serial continuous data. In this case, the mel-spectrogram data and the UWB signal matrix data of the speakers may be 2D data.

According to an example embodiment, the multimodal learning module 1300 may generate the characteristic values using a GAN.

In operation S40, the speaker diarization module 1400 may determine whether the characteristic values represent specific speakers based on the similarity between the characteristic values and the previously stored speaker characteristic values. The previously stored speaker characteristic values may include voice characteristic values and motion characteristic values of the speakers.

The speaker diarization module 1400 may compare the characteristic values with previously stored speaker characteristic values of a first speaker, a second speaker, and a third speaker, respectively, and when the characteristic values match previously stored characteristic values of a particular speaker, the characteristic values may be determined as those of the particular speaker (operation S50).

Conversely, when the characteristic values do not match the previously stored characteristic values of the speakers, the speaker diarization module 1400 may store the characteristic values as characteristic values of a new speaker (operation S60).

In operation S70 for determining whether speaking has been finished, the speaker diarization model implementing apparatus 100 may terminate the speaker diarization method when the user provides a speaking termination input or may repeat operations S20 to S60 when the user does not provide a speaking termination input.

Figure 8:
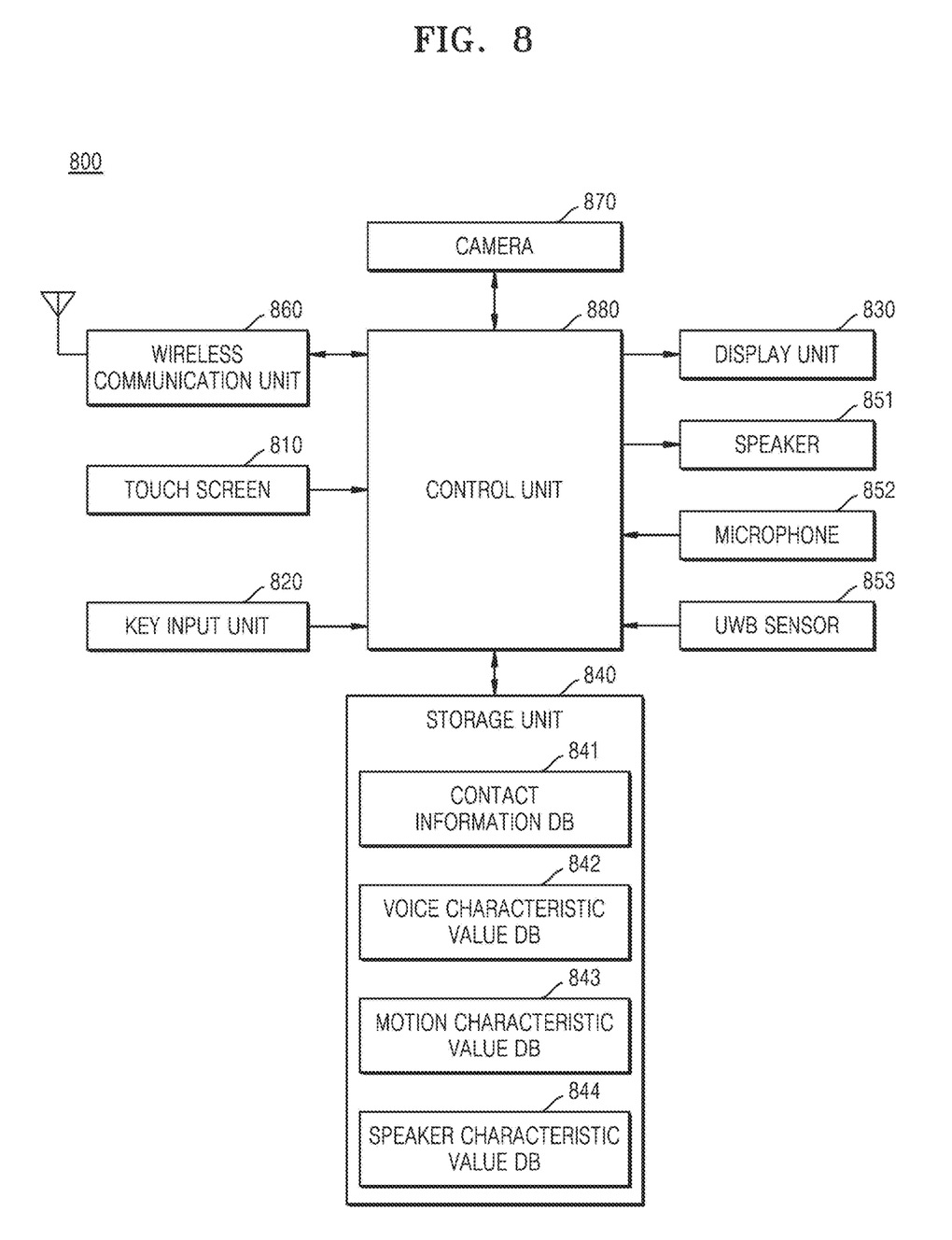
FIG. 8 is a block diagram illustrating a portable terminal according to an example embodiment.

FIG. 8 is a block diagram illustrating a portable terminal 800 according to an example embodiment.

Referring to FIGS. 1 to 8, the portable terminal 800 of an example embodiment may include a touch screen 810, a key input unit 820, a display unit 830, a storage unit 840, a speaker 851, a microphone 852, an UWB sensor 853, a wireless communication unit 860, a camera 870, and a control unit 880.

The touch screen 810 may transmit touch signals to the control unit 880. The touch signals may be classified into touch & drop, drag & drop, flick & drop, and the like. Here, touch & drop refers to an action of pressing a certain point and releasing a finger from the point, drag & drop refers to an action of moving a finger in a certain direction while pressing a certain point, and then releasing the finger, and flick & drop refers to an action of moving a finger at a high speed and then releasing the finger, like bouncing a finger. The control unit 880 may distinguish between flick and drag based on the velocity of movement. In addition, the touch screen 810 may be of a resistive type, a capacitive type, a pressure type, or the like.

The key input unit 820 may include a plurality of keys for manipulating the portable terminal 800 and may be configured to transmit key signals to the control unit 880. Here, the key signals may be classified into a power on/off signal, a volume control signal, and a screen on/off signal.

The display unit 830 may be configured to convert image data received from the control unit 880 into an analog signal and displays the analog signal. When a user touches and drops an icon, the control unit 880 may execute a corresponding application, and switching from a home screen to an application execution screen may be performed. For example, when a user touches and drops an icon for a video call, the control unit 880 may control the display unit 830 to display a call execution screen in a main screen area. In addition, a sub-screen may provide an image including an application icon that is being executed or is a user's favorite application.

The storage unit 840 may store programs and data, such as an operating system (OS), applications, images, audio files, or videos, necessary for operations of the portable terminal 800. In addition, the storage unit 840 may include a main storage unit and a secondary storage unit. Here, the main storage unit may include flash memory, and the secondary storage unit may include RAM.

The main storage unit may provide a space in which the OS and applications are loaded. That is, when the portable terminal 800 is booted, the OS may be executed in a state in which the OS is loaded from the secondary storage unit to the main storage unit. In addition, applications may be executed in a state in which the applications are loaded from the secondary storage unit to the main storage unit. When the execution of an application is terminated, the application may be deleted from the main storage unit. In addition, the secondary storage unit may provide a space for storing the OS, various applications, and various pieces of data. Here, the secondary storage unit may be divided into a data area and a program area. For example, in the example embodiment shown in FIG. 8, the data area may include a contact information database (DB) 841, a voice characteristic value DB 842, a motion characteristic value DB 843, and a speaker characteristic value DB 844.

The speaker 851 may convert a digital audio signal into an analog audio signal and may output the analog audio signal.

The microphone 852 may receive an analog audio signal and convert the analog audio signal into a digital audio signal. Speaker voice files may have extensions such as m4a, acc, mkv, or mp3, but are not limited thereto.

In an example embodiment, the UWB sensor 853 may include a plurality of antennas configured to emit an UWB transmission signal and receive an UWB reflection signal, and an UWB transceiver connected to the antennas through switches. The portable terminal 800 may obtain information on at least one of the positions, distances, movements, and directions of speakers based on a UWB transmission signal and a UWB reflection signal that are transmitted or received through the UWB sensor 853.

The wireless communication unit 860 may transmit and receive signals related to mobile phone communication, short message service (SMSs) or multimedia message service (MMS), voice calls, video calls, data communication, or the like. In addition, the wireless communication unit 860 may convert data such as voice/sound data or control data into wireless signals and may transmit the wireless signals. In addition, the wireless communication unit 860 may receive wireless signals and convert the wireless signals into data such as voice/sound data or control data and may output the data. To this end, the wireless communication unit 860 may include a radio frequency transmitter configured to upconvert and amplify the frequency of a transmission signal, and a radio frequency receiver configured to amplify a received signal with low noise and downconvert the frequency of the amplified signal.

The camera 870 may capture images and output the captured images to the control unit 880. The camera 870 may include a front camera provided on a front side of the portable terminal 800 and a rear camera provided on a rear side of the portable terminal 800.

The control unit 880 may control overall operations of the portable terminal 800 and may control the flow of signals between internal blocks of the mobile terminal 800. In an example embodiment, the control unit 880 may separate speakers based on voice signals and UWB reflection signals. The control unit 880 may generate mel-spectrogram data from voice signals and UWB signal matrix data of speakers from UWB reflection signals, extract characteristic values based on the mel-spectrogram data and the UWB signal matrix data, and separate the speakers from each other based on the characteristic values and previously stored speaker characteristic values (e.g., by comparing the characteristic values with previously stored speaker characteristic values).

The control unit 880 may generate the UWB signal matrix data using at least one of the positions of the antennas, the emission time of a UWB transmission signal, the reception time of a UWB reflection signal, the magnitude and angle of the UWB transmission signal, and the magnitude and angle of the UWB reflection signal. In this case, the UWB signal matrix data may include at least one of a piece of information on the locations of the speakers, a piece of information on the directions of the speakers, a piece of information on the movement amounts of the speakers, and a piece of information on the movement velocities of the speakers.

When the characteristic values match the previously stored speaker characteristic values, the control unit 880 may classify the characteristic values as those of one of the speakers, and when the characteristic values do not match the previously stored speaker characteristic values, the control unit 880 may store the characteristic values as those of a new speaker.

As described above, according to the one or more of the above example embodiments, the speaker diarization model implementing apparatuses, the speaker diarization methods, and the portable terminals including the speaker diarization model implementing apparatus may improve the accuracy of speaker diarization by inferring motions (for example, mouth motions, hand gestures, or the like) of potential speakers from motion data additionally obtained using the UWB sensor (or motion data analysis module).

Effects of the embodiments are not limited to the effects mentioned above, and effects not mentioned above will be clearly understood by those skilled in the art through the specification and the accompanying drawings.

Any functional units, modules, or blocks shown in the figures and described above may be implemented in processing circuitry such as hardware including logic circuits, a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to some example embodiments thereof, it will be understood that various changes in form and details may be made therein without departing from the spirit and scope of the following claims.

What is claimed is:

1. An electronic apparatus comprising:
    a voice signal analysis module configured to generate mel-spectrogram data from voice signals of a plurality of speakers detected by a voice recognition device;
    a motion data analysis module configured to generate ultra-wideband (UWB) signal matrix data from motion sensing signals of the plurality of speakers detected by a motion recognition device;

a multimodal learning module configured to extract characteristic values based on the mel-spectrogram data and the UWB signal matrix data; and
a speaker diarization module configured to separate the plurality of speakers from each other using the characteristic values.

2. The electronic apparatus of claim 1, wherein the motion recognition device comprises:
a plurality of antennas each configured to emit a UWB transmission signal toward the plurality of speakers and receive a UWB reflection signal reflected from the plurality of speakers; and
a UWB transceiver connected to the plurality of antennas through switches.

3. The electronic apparatus of claim 2, wherein the motion data analysis module is further configured to generate the UWB signal matrix data using at least one of positions of the plurality of antennas, an emission time of the UWB transmission signal, a reception time of the UWB reflection signal, and magnitudes and angles of the UWB transmission signal and the UWB reflection signal.

4. The electronic apparatus of claim 1, wherein the UWB signal matrix data comprises at least one of a piece of information on locations of the plurality of speakers, a piece of information on directions of the plurality of speakers, a piece of information on movement amounts of the plurality of speakers, and a piece of information on movement velocities of the plurality of speakers.

5. The electronic apparatus of claim 1, wherein the voice recognition device comprises at least one microphone configured to detect the voice signals.

6. The electronic apparatus of claim 1, wherein the mel-spectrogram data and the UWB signal matrix data of the plurality of speakers are 2D data, and the characteristic values are obtained by concatenating the mel-spectrogram data and the UWB signal matrix data into serial continuous data.

7. The electronic apparatus of claim 1, wherein the multimodal learning module is further configured to extract the characteristic values using a generative adversarial network (GAN).

8. The electronic apparatus of claim 1, wherein
the speaker diarization module is further configured to separate the plurality of speakers from each other based on the characteristic values and previously stored speaker characteristic values, and
the previously stored speaker characteristic values comprise a voice characteristic value and a motion characteristic value of each of the plurality of speakers.

9. The electronic apparatus of claim 8, wherein
when the characteristic values match previously stored speaker characteristic values, the speaker diarization module is further configured to classify the characteristic values as characteristic values of a corresponding one of the plurality of speakers, and
when the characteristic values do not match the previously stored speaker characteristic values, the speaker diarization module is further configured to store the characteristic values as characteristic values of a new speaker.

10. A speaker diarization method comprising:
inputting a number of a plurality of speakers;
generating mel-spectrogram data from voice signals of the plurality of speakers detected by a speech recognition device and ultra-wideband (UWB) signal matrix data from motion sensing signals of the plurality of speakers detected by a motion recognition device;
extracting characteristic values based on the mel-spectrogram data and the UWB signal matrix data; and
separating the plurality of speakers from each other based on the characteristic values and previously stored speaker characteristic values.

11. The speaker diarization method of claim 10, wherein the UWB signal matrix data comprises at least one of a piece of information on locations of the plurality of speakers, a piece of information on directions of the plurality of speakers, a piece of information on movement amounts of the plurality of speakers, and a piece of information on movement velocities of the plurality of speakers.

12. The speaker diarization method of claim 10, wherein the mel-spectrogram data and UWB signal matrix data of the plurality of speakers are 2D data, and the characteristic values are obtained by concatenating the mel-spectrogram data and the UWB signal matrix data into serial continuous data.

13. The speaker diarization method of claim 10, wherein the extracting of the characteristic values is performed using a generative adversarial network (GAN).

14. The speaker diarization method of claim 10, wherein the previously stored speaker characteristic values comprise a voice characteristic value and a motion characteristic value of each of the plurality of speakers.

15. The speaker diarization method of claim 10, wherein the separating of the plurality of speakers comprises:
when the characteristic values match the previously stored speaker characteristic values, classifying the characteristic values as characteristic values of a corresponding one of the plurality of speakers; and
when the characteristic values do not match the previously stored speaker characteristic values, storing the characteristic values as characteristic values of a new speaker.

16. A portable terminal comprising:
a microphone configured to acquire voice signals from a plurality of speakers;
an ultra-wideband (UWB) sensor configured to emit UWB transmission signals to the plurality of speakers and receive UWB reflection signals reflected from the plurality of speakers; and
a control unit configured to separate the plurality of speakers from each other based on the voice signals and the UWB reflection signals,
wherein the control unit is further configured to generate mel-spectrogram data from the voice signals and UWB signal matrix data of the plurality of speakers from the UWB reflection signals, extract characteristic values based on the mel-spectrogram data and the UWB signal matrix data, and separate the plurality of speakers from each other based on the characteristic values and previously stored speaker characteristic values.

17. The portable terminal of claim 16, wherein the UWB sensor comprises:
a plurality of antennas configured to emit the UWB transmission signals and receive the UWB reflection signals; and
an UWB transceiver connected to the plurality of antennas through switches.

18. The portable terminal of claim 17, wherein the control unit is further configured to generate the UWB signal matrix data of the plurality of speakers using at least one of positions of the plurality of antennas, emission times of the UWB transmission signals, reception times of the UWB reflection signals, and magnitudes and angles of the UWB transmission signals and the UWB reflection signals.

19. The portable terminal of claim 16, wherein the UWB signal matrix data comprises at least one of a piece of information on locations of the plurality of speakers, a piece of information on directions of the plurality of speakers, a piece of information on movement amounts of the plurality of speakers, and a piece of information on movement velocities of the plurality of speakers.

20. The portable terminal of claim 16, wherein
when the characteristic values match the previously stored speaker characteristic values, the control unit is further configured to classify the characteristic values as characteristic values of a corresponding one of the plurality of speakers, and
when the characteristic values do not match the previously stored speaker characteristic values, the control unit is further configured to store the characteristic values as characteristic values of a new speaker.

* * * * *